(12) United States Patent
Torres (10) Patent No.: US 9,538,730 B1
(45) Date of Patent: Jan. 10, 2017

(54) MATING SENSOR DEVICE FOR LIVESTOCK

(71) Applicant: Pablo Rafael Torres, Buenosaires (AR)

(72) Inventor: Pablo Rafael Torres, Buenosaires (AR)

( * ) Notice: Subject to any disclaimer, the term of this patent is extended or adjusted under 35 U.S.C. 154(b) by 61 days.

(21) Appl. No.: 14/792,929

(22) Filed: Jul. 7, 2015

(51) Int. Cl.
*G08B 23/00* (2006.01)
*A01K 29/00* (2006.01)

(52) U.S. Cl.
CPC ................... *A01K 29/005* (2013.01)

(58) Field of Classification Search
CPC ...... A01K 29/00; A01K 67/02; A01K 15/023; A01K 29/005
See application file for complete search history.

(56) References Cited

U.S. PATENT DOCUMENTS 7,992,521 B2 * 8/2011 Bocquier ............... A01K 21/00
119/174

2008/0128486 A1 * 6/2008 Lowe ..................... A01K 29/00
235/376

* cited by examiner

*Primary Examiner* — Omeed Alizada
(74) *Attorney, Agent, or Firm* — Ruben Alcoba, Esq.

(57) ABSTRACT

A device and method detects the orientation of a copulating livestock to indicate when the copulating livestock is mounted over a recipient livestock. A mounting base attaches the device over the dorsal spine and in the middle line of the back of the copulating livestock. The copulating livestock orients its dorsal spinal cord at about 45° incline while copulating with the recipient livestock. A tilt sensor detects the angle of inclination in relation to gravity or a predetermined reference angle. The copulation angle is generally greater than 45°. A counting apparatus registers the count every time the copulation angle is detected. A transmitter sends the count data to a remote data storage for analysis of copulating patterns. A solar panel provides renewable energy to recharge a battery. A control portion controls the device with a power switch and a reset switch. A camera and light provide more efficient analysis.

20 Claims, 4 Drawing Sheets

MATING SENSOR DEVICE FOR LIVESTOCK

BACKGROUND

It is known that, livestock are domesticated animals raised in an agricultural setting to produce commodities such as food, fiber, and labor. Common types of livestock include, cows, goats, sheep, chickens, and horses. Livestock are generally raised for profit, and thus are a valuable commodity to be protected against disease, sickness, and theft. The inventor was familiar with livestock, and in particular animal husbandry, which is a component of modern agriculture. The inventor was very interested in breeding patterns of the livestock.

The inventor was aware that livestock are generally kept in an enclosure, are fed by human-provided food, and are intentionally bred. However, the inventor was also aware that some livestock are not enclosed, but rather, allowed to breed freely. The inventor knew that in large open ranges the livestock may be only occasionally inspected or yarded in round-ups for counting and assessing the health of the livestock. Often, herding dogs or cowboys could be used for mustering the livestock. But this could be costly, especially for ranches ranging thousands of acres. Nonetheless, the inventor knew that whether fenced up, or free to roam over wide ranges, livestock was susceptible to disease and health concerns.

The inventor observed livestock operations and observed some common problems. The largest problem seen by the inventor was that the breeding, or more specifically, copulating patterns of the livestock was difficult to monitor. This was made more difficult when the livestock roamed over large ranges.

The inventor was aware that more than 90% of the cow's fertilization from a bull in the United States was performed through natural breeding. Through routine observation, the inventor recognized that at the beginning of the mating season, the bulls were routinely checked for mating and fertility capacities. The veterinarian or farmer selected the bulls for a determined herd that was in good reproductive conditions.

Through research and conversation with farmers and veterinarians, the inventor discerned that determining when a bull copulates over a cow is an indication of *oestrus*, which is important to determine the fertile period when cows may be artificially inseminated. Additionally, the health of the bull or a cow can be determined based on the copulation pattern, so as to cull out the weaker livestock that are not reproducing efficiently.

However, the inventor quickly learned that once the bulls are put with the cows, they are seldom checked for their ability to mate appropriately. This was chiefly due to the difficulty to follow or closely check the bulls under forage conditions and also because there is a natural tendency that the bull to mate early in the morning. Another factor is the great amount of time needed to check multiple bulls at the same time.

The inventor recognized that there would have to be a means to detect every time the bull copulated with the cow, so as to better manage the reproduction patterns. The inventor observed the copulation and noted that during copulation, the bull lifts the trunk and anterior part while keeping the substantial portion of the weight of the body over the rear legs. This inclined lift is made along a forward movement and so the bull is positioned over the back of the cow. The inventor also saw that at the time of thrust or just before it, the bull moved forward with the necessarily curving of the spine which is maximum in the dorsal spine area. This produced an angle in the dorsal spine of at least 45°. The inventor decided that by detecting this 45° angle, the moment of copulation could be determined.

The inventor researched and learned that a tilt sensor could detect when an angle was changed from a reference, or horizontal angle, to the 45° angle. The inventor decided to develop a device that could mount a tilt sensor on the dorsal spine area of the bull. The device mounted onto the bull, forming a secure covering for protecting the tilt sensor. However, the device was disturbed while attached to the bull. Other animals, fences, posts, and trees would knock it from its place on the bull. The inventor added elastic straps and an uneven mounting surface to further secure the device to the back of the bull.

However, the inventor soon learned that the number of times that the bull copulated was not known. The inventor integrated a counting apparatus into the device. The inventor operatively connected the counting apparatus to the tilt sensor, such that every time the tilt sensor detected the bull in a 45° angle, the counting apparatus registered a count. The inventor then continued enhancing the device by including a transmitter that transmitted the count data to a remote data storage. In this manner, analysis of the breeding habits was facilitated.

However, the inventor soon realized that the battery that powered the device would die quickly and negate all the advantages of managing the breeding patterns. The inventor was aware that portable solar cell electricity chargers have been developed to receive and convert sunlight into electrical energy. The inventor also knew that livestock chiefly remained outside under the sun. The inventor decided to integrate a solar panel into the device, such that it could operate for extended period of times (a year or longer) without battery replacement or power outages.

The inventor further modified the device by providing a remote processor that could operatively communicate with the device. And since the device was now operable remotely, the inventor decided to integrate a tracking processor and chip in the apparatus. In this way, the device could be remotely operated and the livestock could be remotely tracked. The inventor finally took the step of including a gyroscope to the tracking chip so that it would be apparent if the livestock fell to its side, such as in an accident or death. The inventor also developed a livestock breeding management method based on the device.

Managing livestock for breeding purposes has been performed in the past, yet none with the present characteristics of the present invention. See Patent numbers: U.S. Pat. No. 5,686,490; Chinese CN102870739; and U.S. 20090283050.

For the foregoing reasons, there is a need for a device and method for managing livestock breeding patterns by detecting a mounting or bulling position by a copulating livestock over a recipient livestock that correlates with copulation behavior.

SUMMARY

The present invention describes a device and method for managing livestock husbandry; and specifically a device and method for managing copulation habits of livestock by detecting, counting, and transmitting a mounting or bulling position by a copulating livestock over a recipient livestock. In some embodiments, the device and method may detect the orientation of a copulating livestock to indicate that the livestock is in a mounting position over a recipient livestock.

Those skilled in the art will recognize that a copulating livestock that has its dorsal spinal cord inclined at about 45° while copulating. This 45° copulation angle is not produced at other physiological movements of the animal such as walking, running, eating, standing up or lying down. Thus, the 45° angle provides an accurate indication that copulation is occurring.

In some embodiments, the device may detect the orientation of a copulating livestock to indicate when the copulating livestock is mounted over a recipient livestock. A mounting base attaches the device over the dorsal spine and in the middle line of the back of the copulating livestock. The copulating livestock orients its dorsal spinal cord at about 45° incline while copulating with the recipient livestock. A tilt sensor detects the angle of inclination in relation to gravity or a predetermined reference angle. The copulation angle is generally greater than 45°, while the reference angle is generally horizontal with a ground surface, i.e., about 0°.

A counting apparatus registers the count every time the copulation angle is detected by the tilt sensor. A transmitter sends the count data to a remote data storage for analysis of copulating patterns. A solar panel provides renewable energy to recharge a battery. A control portion directly or remotely controls the device with a power switch and a reset switch.

In some embodiments, the device provides a copulation detecting means that attaches directly to the copulating livestock. The device detects when and how many times a copulating livestock, such as a bull, lifts to a copulating position, i.e., 45°, to cover a recipient livestock, such as a cow. Thus, the device is a physical piece of hardware that attaches in the vicinity of the dorsal spinal cord, such as at a midpoint of the back of the livestock.

The device comprises a tilt sensor that detects the angle of inclination of the livestock in relation to gravity or a predetermined reference plane, depending on the type of tilt sensor being used. The tilt sensor registers a count every time the copulating livestock lifts to the copulation angle. This registration for each time the livestock lifts to the copulation angle is performed with a counting apparatus. Thus, the counting apparatus counts the number of times the copulating livestock forms the generally 45° angle, which indicates that copulation is occurring at that specific moment.

The counting apparatus may then transmit the count data to a remote data storage for analysis. A transmitter may be used for this function. In one embodiment, the device perpetually monitors and counts the mating activities of the copulating livestock 24 hours a day, during an entire mating season.

Those skilled in the art, in light of the present teachings, will recognize that determining when a bull copulates over a cow is an indication of *oestrus*, which is important to determine the fertile period when cows may be artificially inseminated. Additionally, the health of the bull or a cow can be determined based on the copulation pattern, so as to cull out the weaker livestock that are not reproducing efficiently. The device and method may also be efficacious for tracking interactive behavioral patterns and location of the livestock.

Consequentially, the device minimizes time and costs associated with managing the breeding habits of livestock, especially over large areas or with large numbers of livestock. It is also significant to note that the device may be attached to a female cow, since the cow also mounts other cows or castrated bulls. Thus, the device is not limited to bulls or male livestock.

The device includes a mounting base that rests flush with the livestock. The mounting base utilizes at least one strap to attach proximally to the withers of the livestock in a disposition that minimizes movement and slippage by the device, but also optimizes accurate measurements by the tilt sensor.

In one embodiment, the mounting base of the device positions directly on the skin of a copulating livestock, over the dorsal spine and in the middle line of the back. Those skilled in the art will recognize that this position is directly above the spinous apofisis of the dorsal spine. However, in other embodiments, the device may be positioned at the neck, tail, or sides of the copulating livestock. It is significant to note that the placement of the device is less consequential than the accurate reading by the tilt sensor.

The device attaches to the copulating livestock through a pair of elastic and adjustable straps that extend from the mounting base. Each elastic strap crosses over a forelimb armpit and over the back of the copulating livestock before securing to the device. In some embodiments, the device may have a bottom surface with an uneven ridges for frictionally engaging the copulating livestock and further minimizing slippage. In this manner, the device is securely retained in place.

This disposition of the device helps ensure retention of the device directly over the dorsal spine and in the middle line of the back/vertebrae. Additionally, since the device is primarily positioned directly above the median line of the vertebral column, rather than the sides, front, or rear of the copulating livestock; accidental engagements with other livestock, trees, fences, and scratching posts is minimized. Furthermore, the disposition of the device on the back of the copulating livestock does not interfere with free walking, lying down, eating, drinking, or mating by the copulating livestock.

In some embodiments, the device may include a control portion that helps control the device. The control portion provides switches and displays for monitoring the device and the copulating livestock. The control portion may be attached directly on the device, or may be at a remote data storage portion for remote control of the device. The control portion may include, without limitation, a button, a switch, a display screen, an antenna, and an alarm. In one possible embodiment, the alarm is configured to indicate an event, such as actions by the copulating livestock, misalignment of the device, and nonoperation of the tilt sensor.

In some embodiments, the control portion may further include a power switch to turn on and off the device. The power switch may be utilized to save energy to a display screen and to the tilt sensor, and thus may only be visible when set to an on position. A reset switch may also be used to reset a counting apparatus that registers the number of times the copulating livestock inclines to the copulation angle. Additional switches may be used to calibrate the tilt sensor, including the sensitivity and the reference plane thereof. The power switch and the reset switch may be operated remotely. The power switch and the reset switch may also be optional.

The device may also be powered by a battery. The battery may include a rechargeable battery, a nickel-cadmium battery, or any voltaic cell known in the art. In another embodiment, a solar cell generates electricity for the battery and/or the device. The solar cell provides renewable energy for recharging a power source in the device. The solar cell is configured to orient upwardly relative to the back of the livestock to minimize damage from other livestock and objects, and optimize the capturing of sunlight. The use of the solar cell allows the device to function for long periods of time without intervention. Those skilled in the art will recognize that livestock on large ranches may travel long distances for long durations. The use of renewable energy, such as that provided by a solar cell helps reduce maintenance costs for the device and method, as a whole.

In one alternative embodiment, the device may include a tracking portion that tracks both the position of the livestock in a predetermined area, and the orientation of the livestock. The position of the livestock may be useful for herd management. For example, monitoring a stray animal from the herd. The tracking portion may utilize any tracking device known in the art to monitor the position of the livestock, including, without limitation, GPS, Wi-Fi system, and radio frequency instruments.

A tracking processor, a tracking chip, and an antenna may be used inside the device to operate the tracking portion. Similarly to the position of the livestock, the orientation of the livestock may be useful for determining the effects of the medication and the general health of the livestock. For example, a livestock that is oriented on its side may indicate a sick or dead livestock. A gyroscope and various modifications thereof may be effective for indicating the orientation of the livestock.

In some embodiments, the device and method enables both direct and remote operation and monitoring of the device. The device may be operated directly through a control portion, which includes a display screen, the power switch, and the reset switch. The control portion enables direct functional operation of the device, including, without limitation, powering on and off the device, adjusting the reference angle and sensitivity of the tilt sensor, setting the sensitivity of the tracking portion, adjusting the parameters of a tracking range, and setting alarms to indicate various events with the livestock, such as lack of a predetermined number of copulations in a period of time.

The display screen serves to display the results of these functions, including data that indicates the intervals at which the device tilts at the copulation angle. In one embodiment, the device may also be controlled through a remote processor, whereby generally the same functions are possible as with the more directly operated control portion on the device. In another embodiment, an alarm on the device indicates to the remote processor when the tilt sensor is flawed or nonoperational.

One objective of the present invention is to provide a device that detects copulation patterns of livestock.

Yet another objective is to provide a mounting base that securely mounts the device on the back of the livestock.

Another objective is to provide at least one strap that holds the device in a position on the back, such that the device is not disturbed by inadvertent engagement with other livestock or objects.

Another objective is to provide a tilt sensor that detects the reference angle and the copulation angle.

Yet another objective is to monitor the tilt sensor and alert when the tilt sensor is flawed.

Yet another objective is to generate an accurate count every time the livestock lifts to the copulation angle.

Yet another objective is to monitor the orientation of the livestock to determine if the livestock is sick or dead.

Yet another objective is to power the device with a renewable energy source, such as solar energy.

Yet another objective is to provide a device for management of livestock husbandry that attaches directly on livestock and that requires minimal time and effort to operate.

Yet another objective is to provide an inexpensive to implement device and method for management of livestock husbandry that is adaptable across a variety of livestock.

DRAWINGS

These and other features, aspects, and advantages of the present invention will become better understood with regard to the following description, appended claims, and drawings where:

DESCRIPTION

One embodiment, referenced in FIGS. 1-4, illustrates a device 100 and method 300 for managing livestock husbandry; and more specifically, a device 100 and method 300 for detecting, counting, and transmitting data that indicates a mounting or bulling position by a copulating livestock 200 over a recipient livestock 202. In some embodiments, the device 100 is configured to detect the orientation of a copulating livestock 200 to indicate when the copulating livestock 200 is mounted over a recipient livestock 202. In this manner, the breeding and interaction patterns by the livestock 200, 202 may more efficiently be collected and analyzed.

In some embodiments, the copulating livestock 200 may include, without limitation, a bull, a ram, a buck, a stallion, and a dog. The recipient livestock 202 may include, without limitation, a cow, a castrated bull, an ewe, a nannie, a mare, and a bitch. The device 100 may be utilized with a single animal, a herd of livestock, or a herd leader, such as a bull.

Figure 1:
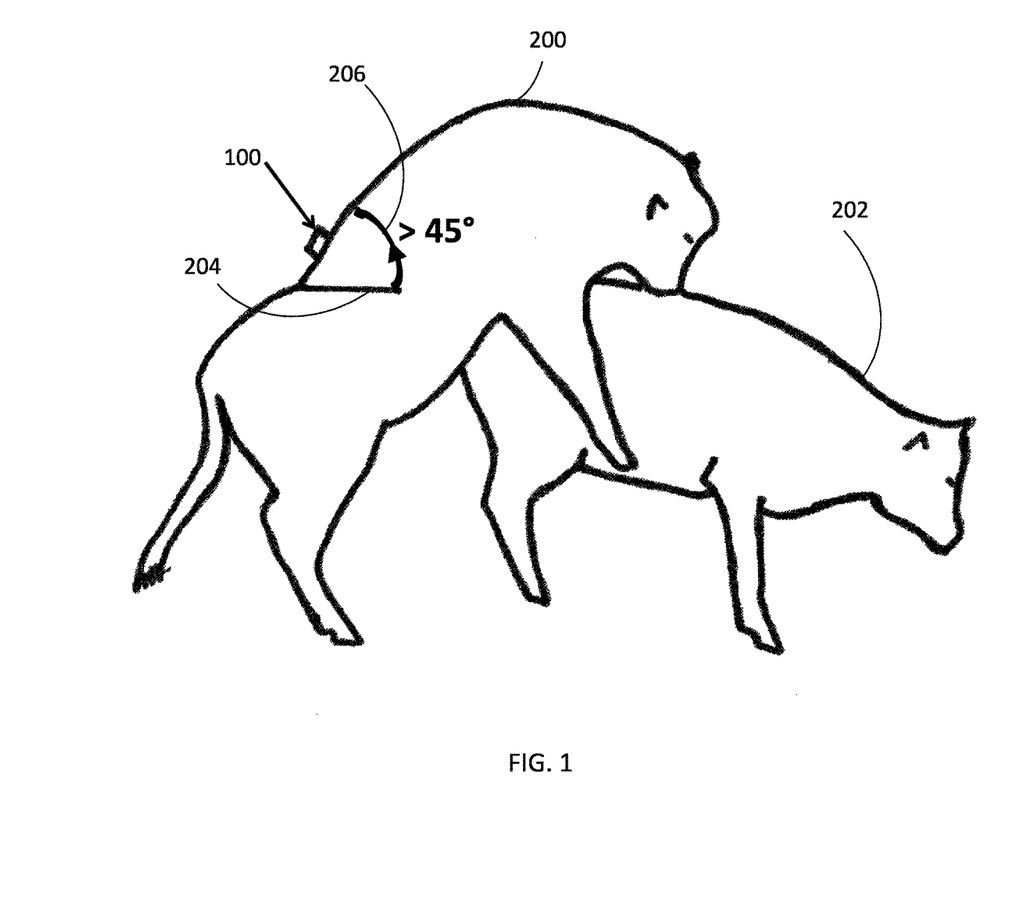
FIG. 1 is a side view of a copulating livestock mounting a recipient livestock while in the copulation angle and while wearing a device for management of livestock husbandry.

As referenced in FIG. 1, a mounting base 102 attaches the device 100 over the dorsal spine and in the middle line of the back of the copulating livestock 200. During copulation, the copulating livestock 200 orients its dorsal spinal cord at about 45° incline while mounted over the recipient livestock 202. Those skilled in the art will recognize that a copulating livestock 200 that has its dorsal spinal cord inclined at about 45° is generally copulating. This copulation angle 206 is generally not produced at other physiological movements of the animal such as walking, running, eating, standing up or lying down. Thus, the 45° angle provides an accurate indication that copulation is occurring.

A tilt sensor 104 detects the angle of inclination in relation to gravity or a predetermined reference angle 204. The tilt sensor 104 detects when the device 100 on the back of the copulating livestock 200 moves from the reference angle 204 to the copulation angle 206, which is generally greater than 45°. A counting apparatus 110 registers the count every time the copulation angle 206 is detected. A transmitter (not shown) sends the count data to a remote data storage (not shown) for analysis of copulating patterns. A battery 112 powers the device 100. A solar panel 114 provides renewable energy to recharge the battery 112. A control portion 116 directly or remotely controls the device 100 with a power switch 108 and a reset switch 106.

In some embodiments, the device 100 provides a copulation detecting means that attaches directly to the copulating livestock 200. The device 100 detects when and how many times a copulating livestock 200, such as a bull, lifts to a copulating position, i.e., 45°, to cover a recipient livestock 202, such as a cow (FIG. 1). Thus, the device 100 is a physical piece of hardware that attaches in the vicinity of the dorsal spinal cord, such as at a midpoint of the back of the livestock.

Figure 2:
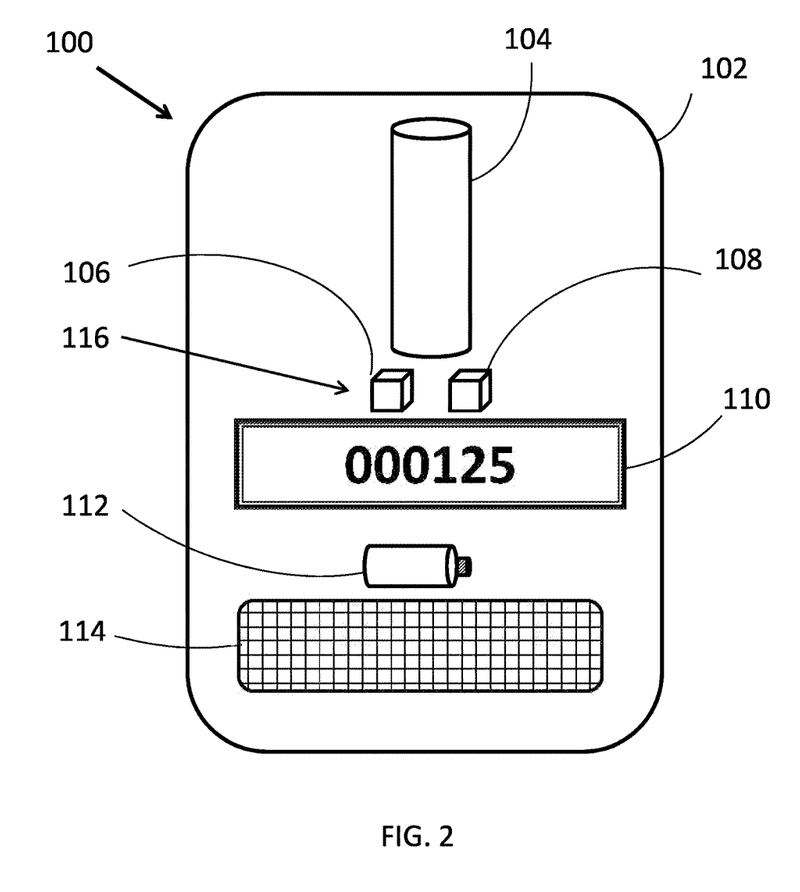
FIG. 2 is a top view of an exemplary device for management of livestock husbandry.

As illustrated in FIG. 2, the device 100 comprises a tilt sensor 104 that detects the angle of inclination of the copulating livestock 200 in relation to gravity or a predetermined reference angle 204.

The copulation angle 206 is the angle formed by the copulating livestock 200 mounting a recipient livestock 202. The reference angle 204 is the angle formed by the copulating livestock 200 oriented substantially parallel with a ground surface. In one embodiment, the copulation angle is at least 45 degrees of deviation from the reference angle 204. Thus, the tilt sensor 104 detects both the reference angle 204 and the copulation angle 206 in determining whether the copulation is occurring.

Turning now to FIG. 2, the tilt sensor 104 is operatively connected to a counting apparatus 110. The counting apparatus 110 registers a count every time the copulating livestock 200 lifts to the copulation angle 206. Thus, the counting apparatus 110 counts the number of times the copulating livestock 200 forms the generally 45° copulation angle 206, which indicates that copulation is occurring at that specific moment. The counting apparatus 110 may then transmit the copulation count data to a remote data storage for analysis of livestock patterns and habits.

A transmitter (not shown) sends the count data to a remote data storage (not shown) for analysis of copulating patterns. The transmitter may include a radio frequency apparatus. The radiofrequency apparatus may send a signal to a receptive device located on the recipient livestock 202 to identify the copulating livestock 200 and the recipient livestock 202 that are breeding. In one embodiment, the device 100 perpetually monitors and counts the mating activities of the livestock 200, 202 twenty-four hours a day, during an entire mating season.

In one exemplary embodiment of operation of the device 100, the copulating livestock 200 lifts the trunk and anterior part while keeping the substantial portion of the weight of the body over the rear legs. This inclined lift is made along a forward movement and so the copulating livestock 200 is positioned over the back of the recipient livestock 202. At the time of thrust or just before it, the copulating livestock 200 moves forward with the necessarily curving of the spine which is maximum in the dorsal spine area. This produces the copulation angle 206 of the dorsal spine of at least 45°. The tilt sensor 104 detects this inclination to at least 45° and registers it with a counting apparatus 110. The tilt sensor 104 may automatically power on when the horizontal disposition of the device 100 is altered by at least 45°. It is significant to note that occasionally, the copulating livestock 200 may jump over a fence, causing the tilt sensor 104 to erroneously detect the copulation angle 206. However, this false reading is generally not a common occurrence.

Those skilled in the art, in light of the present teachings, will recognize that determining when a bull copulates over a cow is an indication of *oestrus*, which is important to determine the fertile period when cows may be artificially inseminated. Additionally, the health of the bull or a cow can be determined based on the copulation pattern, so as to cull out the weaker livestock that are not reproducing efficiently.

The device 100 may also be efficacious for tracking interactive behavioral patterns and location of the livestock.

Consequentially, the device 100 minimizes time and costs associated with managing the breeding habits of livestock, especially over large areas or with large numbers of livestock. It is also significant to note that the device 100 may be attached to a female cow, since the cow also mounts other cows or castrated bulls. Thus, the device 100 is not limited to bulls or male livestock.

As referenced in FIG. 2, the device 100 includes a mounting base 102 that rests flush on the back of the copulating livestock 200. The mounting base 102 utilizes at least one strap to attach proximally to the back of the livestock in a disposition that minimizes movement and slippage by the device 100, but also optimizes accurate measurements by the tilt sensor 104. The mounting base 102 may include a cube shape, a rectangular shape, or an elongated planar shape. In any case, the mounting base 102 is configured to rest comfortably on the dorsal area above the back of the copulating livestock 200. In one embodiment, the mounting base 102 includes a mounting surface having ridged or textured characteristics that inhibit slippage from the skin and fur of the copulating livestock 200. In one embodiment, an adhesive may be used on the mounting surface to restrict slippage and movement of the device 100.

In one embodiment, the mounting base 102 of the device 100 positions directly on the skin of a copulating livestock 200, over the dorsal spine and in the middle line of the back. Those skilled in the art will recognize that this position is directly above the spinous apofisis of the dorsal spine. However, in other embodiments, the device 100 may be positioned at the neck, tail, or sides of the copulating livestock 200. It is significant to note that the placement of the device 100 is less consequential than the accurate reading by the tilt sensor 104.

The device 100 attaches to the copulating livestock 200 through a pair of elastic and adjustable straps that extend from the mounting base 102. Each elastic strap crosses over a forelimb armpit and over the back of the copulating livestock 200 before securing to the device 100. In some embodiments, the device 100 may have a bottom surface with an uneven ridges for frictionally engaging the copulating livestock 200 and further minimizing slippage. In this manner, the device 100 is securely retained in place.

In another embodiment of the device 100, the mounting base 102 shall be glued to the dorsal area of the male copulating animal. The glue shall be any affixing material that is known in the art of gluing an item to hair.

This disposition of the device 100 helps ensure retention of the device 100 directly over the dorsal spine and in the middle line of the back/vertebrae. Additionally, since the device 100 is primarily positioned directly above the median line of the vertebral column, rather than the sides, front, or rear of the copulating livestock 200; accidental engagements with other livestock, trees, fences, and scratching posts is minimized. Furthermore, the disposition of the device 100 on the back of the copulating livestock 200 does not interfere with free walking, lying down, eating, drinking, or mating by the copulating livestock 200.

In some embodiments, the device 100 may include a control portion 116 that helps control the device 100. The control portion 116 provides switches and displays for monitoring the device 100 and the copulating livestock 200. The control portion 116 may be attached directly on the device 100, or may be at a remote data storage portion for remote control of the device 100. The control portion 116 may include, without limitation, a button, a switch, a display screen, an antenna, and an alarm. In one possible embodiment, the alarm is configured to indicate an event, such as actions by the copulating livestock 200, misalignment of the device 100, and nonoperation of the tilt sensor 104.

In some embodiments, the control portion 116 may further include a power switch 108 to turn on and off the device 100. The power switch 108 may be utilized to save energy to a display screen and to the tilt sensor 104, and thus may only be visible when set to an on position. A reset switch 106 may also be used to reset a counting apparatus 110 that registers the number of times the copulating livestock 200 inclines to the copulation angle 206. Additional switches may be used to calibrate the tilt sensor 104, including the sensitivity and the reference plane thereof. The power switch 108 and the reset switch 106 may be operated remotely. The power switch 108 and the reset switch 106 may also be optional.

In one alternative embodiment, the device includes a microprocessor to perform data analysis or to perform certain statistics as needed by the user. In another embodiment, the device includes a light to show when the copulating livestock 200 mounts so as to be seen from far in the dark. In yet another alternative embodiment, the device includes a camera to enable visual monitoring of the copulating livestock 200 either passively or from a remote location.

The device 100 may also be powered by a battery 112. The battery 112 may include a rechargeable battery 112, a nickel-cadmium battery 112, or any voltaic cell known in the art. In another embodiment, a solar panel 114 generates electricity for the battery 112 and/or the device 100. The solar panel 114 provides renewable energy for recharging a power source in the device 100. The solar panel 114 is configured to orient upwardly relative to the back of the copulating livestock 200 to minimize damage from other livestock and objects, and optimize the capturing of sunlight.

The use of the solar panel 114 allows the device 100 to function for long periods of time without intervention. Those skilled in the art will recognize that livestock 200, 202 on large ranches may travel long distances for long durations. The use of renewable energy, such as that provided by the solar panel 114 helps reduce maintenance costs for the device 100, as a whole.

In one alternative embodiment, the device 100 may include a tracking portion (not shown) that tracks both the position of the livestock 200, 202 in a predetermined area, and the orientation of the livestock 200, 202. The position of the livestock 200, 202 may be useful for herd management. For example, monitoring a stray animal from the herd. The tracking portion may utilize any tracking instruments known in the art to monitor the position of the livestock, including, without limitation, GPS, Wi-Fi system, and radio frequency instruments.

A tracking processor, a tracking chip, and an antenna may be used to operate the tracking portion. Similarly to the position of the livestock 200, 202, the orientation of the livestock 200, 202 may be useful for determining the effects of the medication and the general health of the livestock 200, 202. For example, a livestock 200, 202 that is oriented on its side may indicate a sick or dead livestock. A gyroscope and various modifications thereof may be effective for indicating the orientation of the livestock 200, 202.

In some embodiments, the device 100 enables both direct and remote operation and monitoring of the livestock 202, 202. The device 100 may be operated directly through a control portion 116, which includes a display screen, a power switch 108, and a reset switch 106. The control portion 116 enables direct functional operation of the device 100, including, without limitation, powering on and off the device 100, adjusting the reference angle 204 and sensitivity of the tilt sensor 104, setting the sensitivity of the tracking portion, adjusting the parameters of a tracking range, and setting alarms to indicate various events with the copulating livestock 200, such as lack of a predetermined number of copulations in a period of time.

The display screen serves to display the results of these functions, including data that indicates the intervals at which the device 100 tilts at the copulation angle 206. In one embodiment, the device 100 may also be controlled through a remote processor, whereby generally the same functions are possible as with the more directly operated control portion 116 on the device 100. In another embodiment, an alarm on the device 100 indicates to the remote processor when the tilt sensor 104 is flawed or nonoperational.

Figure 3:
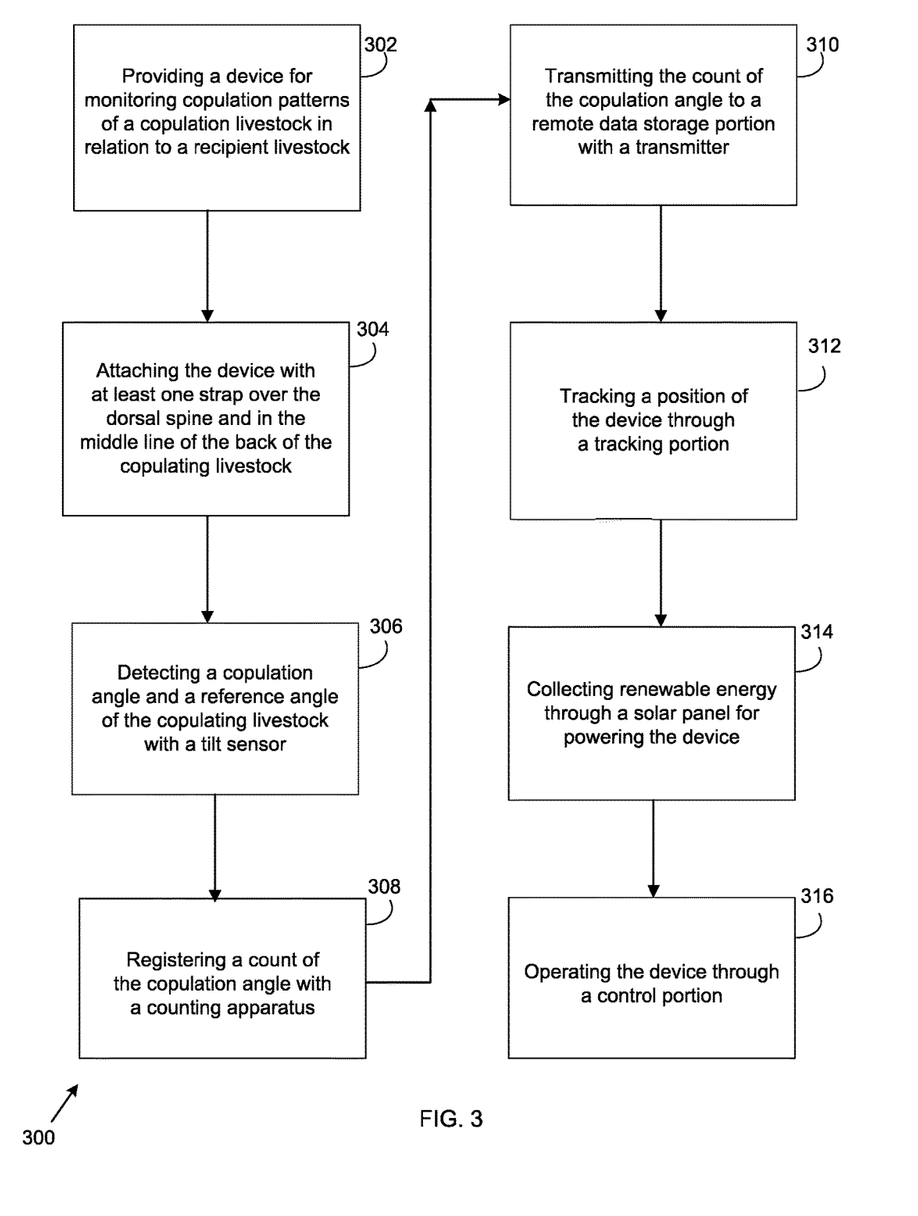
FIG. 3 is a flowchart diagram of an exemplary method for management of livestock husbandry.

FIG. 3 illustrates a method 300 for managing livestock copulation patterns. The method 300 detects the orientation of a copulating livestock 200 to indicate when the copulating livestock 200 is mounted over a recipient livestock 202. An initial Step 302 includes providing a device 100 for monitoring copulation patterns of a copulation livestock in relation to a recipient livestock 202. In some embodiments, the device 100 provides a copulation detecting means that attaches directly to the copulating livestock 200. The device 100 detects when and how many times a copulating livestock 200, such as a bull, lifts to a copulating position, i.e., 45°, to cover a recipient livestock 202, such as a cow (FIG. 1). Thus, the device 100 is a physical piece of hardware that attaches in the vicinity of the dorsal spinal cord, such as at a midpoint of the back of the livestock.

A Step 304 may include attaching the device 100 with at least one strap over the dorsal spine and in the middle line of the back of the copulating livestock 200. The device 100 attaches to the copulating livestock 200 through a pair of elastic and adjustable straps that extend from the mounting base 102. Each elastic strap crosses over a forelimb armpit and over the back of the copulating livestock 200 before securing to the device 100.

A Step 306 comprises detecting a copulation angle 206 and a reference angle 204 of the copulating livestock 200 with a tilt sensor 104. The copulation angle 206 is the angle formed by the copulating livestock 200 mounting a recipient livestock 202. The reference angle 204 is the angle formed by the copulating livestock 200 oriented substantially parallel with a ground surface. In one embodiment, the copulation angle is at least 45 degrees of deviation from the reference angle 204. Thus, the tilt sensor 104 detects both the reference angle 204 and the copulation angle 206 in determining whether the copulation is occurring.

In some embodiments, the method 300 may include a Step 308 of registering a count of the copulation angle 206 with a counting apparatus 110.

A Step 310 includes transmitting the count of the copulation angle 206 to a remote data storage portion with a transmitter. The tilt sensor 104 is operatively connected to a counting apparatus 110. The counting apparatus 110 registers a count every time the copulating livestock 200 lifts to the copulation angle 206. Thus, the counting apparatus 110 counts the number of times the copulating livestock 200 forms the generally 45° copulation angle 206, which indicates that copulation is occurring at that specific moment.

In some embodiments, a Step 312 may include tracking a position of the device 100 through a tracking portion. The device 100 may include a tracking portion that tracks both the position of the livestock 200, 202 in a predetermined area, and the orientation of the livestock 200, 202. The position of the livestock 200, 202 may be useful for herd management. For example, monitoring a stray animal from the herd, or monitoring a herd that has broken through a fence. The tracking portion may utilize any tracking device 100 known in the art to monitor the position of the livestock 200, 202, including, without limitation, a global positioning system, Wi-Fi system, and radio frequency instruments. A tracking processor, a tracking chip, and an antenna may be integrated with the tracking portion to enhance the tracking function. In one embodiment, a smart phone may be operable to download a software application that enables tracking and other general functions of the device 100.

In some embodiments, a Step 314 comprises collecting renewable energy through a solar panel 114 for powering the device 100. In some embodiments, the device 100 may be powered by a portable solar panel 114 that integrates into the device 100 from the power reception panel. The solar panel 114 provides renewable energy for recharging a power source, such as a battery 112, in the device 100. The solar panel 114 is configured to orient upwardly relative to the back of the copulating livestock 200 to minimize damage from other livestock and objects, and optimize the capturing of sunlight. The use of the solar panel 114 allows the device 100 to function for long periods of time without intervention.

A final Step 316 includes operating the device 100 through a control portion 116 and a remote processor. The method 300 enables both direct and remote operation and monitoring of the device 100. The device 100 may be operated directly through a control portion 116, which includes a display screen, a map, and various buttons and switches. The control portion 116 enables direct functional operation of the device 100, including, without limitation, powering on and off the device 100, adjusting the tilt sensor 104, setting the sensitivity of the tracking portion, adjusting the parameters of a tracking range, and setting alarms to indicate various events. The display screen serves to display the results of these functions.

In one embodiment, the device 100 may also be controlled through a remote processor, which provides generally the same functions as with the more directly operated control portion 116 on the device 100. The remote processor may include, without limitation, a computer, a server, a database, a cloud, and a network. In another embodiment, an alarm on the control portion 116 indicates an event to the remote processor.

Figure 4:
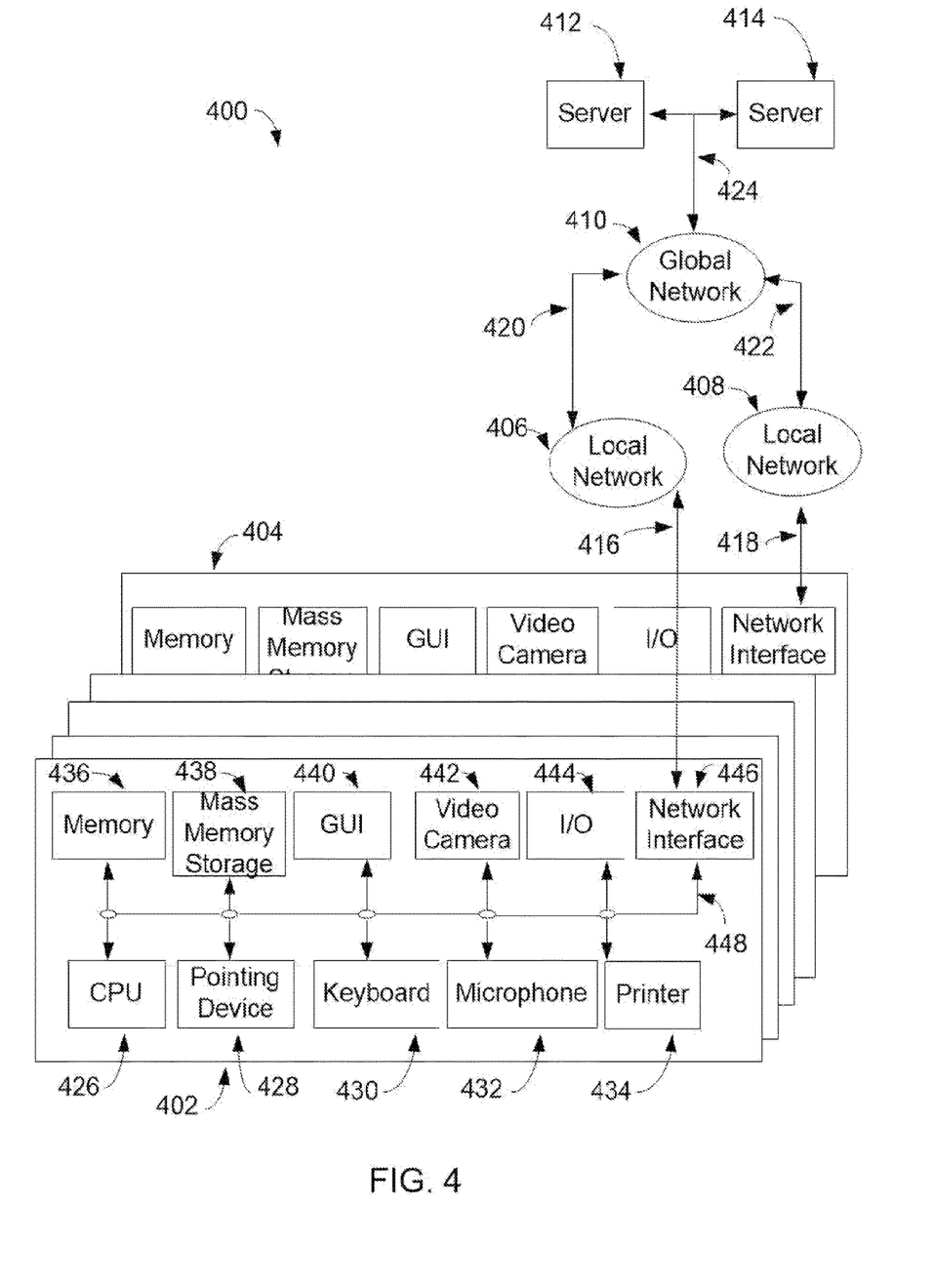
FIG. 4 a block diagram depicting an exemplary client/server system which may be used by an exemplary web-enabled/networked embodiment of the present invention.

FIG. 4 is a block diagram depicting an exemplary client/server system which may be used by an exemplary web-enabled/networked embodiment of the present invention.

A communication system 400 includes a multiplicity of clients with a sampling of clients denoted as a client 402 and a client 404, a multiplicity of local networks with a sampling of networks denoted as a local network 406 and a local network 408, a global network 410 and a multiplicity of servers with a sampling of servers denoted as a server 412 and a server 414.

Client 402 may communicate bi-directionally with local network 406 via a communication channel 416. Client 404 may communicate bi-directionally with local network 408 via a communication channel 418. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

Clients 402 and 404 may take many different forms. Non-limiting examples of clients 402 and 404 include personal computers, personal digital assistants (PDAs), cellular phones and smartphones.

Client 402 includes a CPU 426, a pointing device 428, a keyboard 430, a microphone 432, a printer 434, a memory 436, a mass memory storage 438, a GUI 440, a video camera 442, an input/output interface 444 and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data and the like and is typically a secondary storage medium such as a hard disk. It will be appreciated that the information retained within mass memory storage 438, may, in appropriate cases, be incorporated in standard fashion as part of memory 436 as virtual memory.

CPU 426 may be coupled to GUI 440. GUI 440 enables a user to view the operation of computer operating system and software. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

While the inventor's above description contains many specificities, these should not be construed as limitations on the scope, but rather as an exemplification of several preferred embodiments thereof. Many other variations are possible. For example, the shape and dimensions of the dispenser 206 may vary without affecting the objective of the apparatus 200. Accordingly, the scope should be determined not by the embodiments illustrated, but by the appended claims and their legal equivalents.

What is claimed is:

1. A device for managing livestock husbandry, the device comprises:
    a mounting base, the mounting base defined by a mounting surface and an exterior surface;
    a tilt sensor, the tilt sensor configured to detect a reference angle and a copulation angle, wherein the copulation angle is at least 45 degrees of deviation from the reference angle;
    a counting apparatus, the counting apparatus configured to register a count of the copulation angle;
    a transmitter, the transmitter configured to transmit the count of the copulation angle to a remote data storage portion;
    a reset switch, the reset switch configured to reset the counting apparatus;
    a power switch, the power switch configured to power on and power off the device;
    a battery, the battery configured to generate power for the device; and
    a solar panel, the solar panel configured to generate renewable energy for recharging the battery.

2. The device of claim 1, wherein the device is attached over the dorsal spine and in the middle line of the back of a copulating livestock.

3. The device of claim 2, wherein the mounting surface of the mounting base is defined by a ridged texture configured to create frictional attachment with the skin of the copulating livestock for inhibiting slippage of the device.

4. The device of claim 3, wherein the mounting base comprises at least one strap, the at least one strap configured to fasten the device to the copulating livestock.

5. The device of claim 4, wherein the at least one strap is arranged to cross over a forelimb armpit and over the dorsal spine and in the middle line of the back of the copulating livestock.

6. The device of claim 5, wherein the at least one strap is two straps that are elastic and adjustable.

7. The device of claim 6, wherein the copulation angle is the angle formed by the copulating livestock mounting a recipient livestock.

8. The device of claim 7, wherein the reference angle is the angle formed by the copulating livestock oriented substantially parallel with a ground surface.

9. The device of claim 8, further including a light, the light configured to illuminate the area proximal to the copulating livestock.

10. The device of claim 9, further including a camera, the camera configured to capture an image of the area proximal to the copulating livestock.

11. The device of claim 10, wherein the copulating livestock includes at least one member selected from the group consisting of: a bull, a ram, a buck, a stallion, and a dog.

12. The device of claim 11, wherein the recipient livestock includes at least one member selected from the group consisting of: a cow, a castrated bull, an ewe, a nannie, a mare, and a bitch.

13. The device of claim 1, wherein the mounting base is glued to the dorsal area of a male copulating animal.

14. The device of claim 1, further including a control portion, the control portion including at least one member selected from the group consisting of: a button, a switch, a display screen, an antenna, and an alarm, wherein the alarm operatively connects to the control portion, the alarm configured to indicate an event by the copulating livestock, misalignment of the at least one dispenser, and nonoperation of the tilt sensor.

15. The device of claim 1, further including a tracking portion, the tracking portion configured to track the position of the device with a global positioning system or a radio frequency system.

16. A device for managing livestock husbandry, the device comprises:
    a mounting base, the mounting base defined by a mounting surface and an exterior surface;
    a tilt sensor, the tilt sensor configured to detect a reference angle and a copulation angle, wherein the copulation angle is at least 45 degrees of deviation from the reference angle;
    a counting apparatus, the counting apparatus configured to register a count of the copulation angle;
    a reset switch, the reset switch configured to reset the counting apparatus;
    a power switch, the power switch configured to power on and power off the device;
    a battery, the battery configured to generate power for the device.

17. The device of claim 16, wherein the copulation angle is the angle formed by the copulating livestock mounting a recipient livestock.

18. The device of claim 16, wherein the reference angle is the angle formed by the copulating livestock oriented substantially parallel with a ground surface.

19. The device of claim 16, further including a solar panel, the solar panel configured to generate renewable energy for recharging the battery.

20. A method for managing livestock husbandry, the method comprising:

providing a device for monitoring copulation patterns of a copulation livestock in relation to a recipient livestock;

attaching the device with at least one strap over the dorsal spine and in the middle line of the back of the copulating livestock;

detecting a copulation angle and a reference angle of the copulating livestock with a tilt sensor, wherein the copulation angle is the angle formed by the copulating livestock mounting a recipient livestock, wherein the reference angle is the angle formed by the copulating livestock oriented substantially parallel with a ground surface;

registering a count of the copulation angle with a counting apparatus;

transmitting the count of the copulation angle to a remote data storage portion with a transmitter;

tracking a position of the device through a tracking portion;

collecting renewable energy through a solar panel for powering the device; and operating the device through a control portion.

\* \* \* \* \*